2,899,323
HEAT EXCHANGE PEBBLES

Charles R. Venable, Jr., Bartlesville, Okla., assignor to Phillips Petroleum Company, a corporation of Delaware No Drawing. Application March 15, 1957
Serial No. 646,371

11 Claims. (Cl. 106—65)

This invention relates to a process for making alumina type heat exchange pebbles and to the improved pebbles made by the process.

One of the problems involved in pebble heater processes lies in the deterioration of the pebbles due to mechanical and thermal shock which results in breakage and attrition and replacement of the pebbles with a new supply. In a pebble heater pilot plant being operated as a commercial unit for the cracking of light hydrocarbons the required replacement of pebbles is at the rate of 60,000 to 80,000 pounds per year. The pebbles utilized are of the high alumina type which have been found to be the most satisfactory pebbles thus far. Apparently pebble breakage is at least partially caused by poor firing of the pebbles during manufacture and the inability with present kilns to fire the pebbles at a sufficiently high uniform temperature to develop large enough and a sufficient number of lath-like crystallites of alpha alumina to provide alumina pebbles of sufficient breakage resistance to reduce the breakage during service to an adequately low level.

Accordingly, it is an object of the invention to provide a pebble making process and an improved pebble which decreases the pebble breakage of the pebbles in service. Another object of the invention is to provide a pebble making process and an improved pebble which is fired at temperatures within the limits of present day kilns and which develops an adequate concentration of lath-like crystals of alpha alumina in the pebble. Other objects of the invention will become apparent from a consideration of the accompanying disclosure.

I have found that the addition of silica and at least one metal compound convertible to the oxide by calcination selected from the group consisting of manganese and iron added to a high alumina pebble material when properly fired develop unusually large lathlike alumina crystals at temperatures within the calcination range of present day kilns. The addition of these materials to high alumina pebble material makes it possible to adequately fire the alumina pebbles at a temperature in the range of about 3050 to 3200° F. and, preferably, within the range of 3100 to 3180° F., so as to develop sufficient and adequate lath-like crystallites within the pebble to strengthen the same against cracking and breakage during high temperature use involving rapid temperature changes in pebble heater processes.

The amount of silica added is in the range of 1.0 to 7.0 weight percent of the pebble and preferably in the range of 2.0 to 4.0 weight percent. The amount of manganese and/or iron oxide to be incorporated in the pebble is in the range of 0.05 to 1.5 weight percent and preferably in the range of 0.1 to 0.8 weight percent. Higher concentrations of manganese and/or iron oxide in the pebble composition result in the formation of too much glass and rounded crystals rather than lath-shaped and the resulting pebble is too brittle for long service in pebble heater processes. Manganese oxide is slightly more effective than iron oxide in effecting growth of crystallites in alpha alumina in cooperation with silica. Other additives such as titanium and chromium compounds which convert to the oxides were found to be not nearly so good when added to a high alumina pebble as they had considerably less effect on the growth of lath-like crystallites in the alumina. Alkali metal compounds including potassium, sodium, and lithium were found to produce too much brittleness in the pebble and did not produce lath-like crystallites of sufficient size and concentration to improve the high alumina pebbles but on the contrary reduced the life thereof. Alkali metal oxides also are detrimental because of the conversion of alpha alumina to beta and zeta alumina in their presence. Cobalt, nickel, magnesium, and vanadium were found to be very poor additives for the purpose of the invention.

The silica can be incorporated in the alumina as substantially pure silica or in the form of a compound convertible to the oxide upon calcination. The silicones are one form of silica which can be utilized as the source of silica and which simultaneously incorporate a binder in the pebble material which assists in forming the mixture of components into compact pebbles prior to the calcination thereof. It is also feasible to utilize an alumina raw material (free of components such as the alkali metals, and particularly, sodium) which contains silica in the desired concentration range. If the alumina raw material has an insufficient concentration of silica, additional silica can be incorporated therein. Kaolin, which contains both alumina and silica, of a type which is free of deleterious materials is a good source of silica.

The preferred manganese compound is manganese carbonate but manganese oxide or any other manganese compounds which readily convert to the oxide upon calcination function satisfactorily in the process and in the improved pebble made by the process of the invention.

Pebbles may be made by any of the conventional pebble forming techniques such as by "snowballing" or by extrusion of a plastic pebble mix containing the constituents into cylindrical rods of the desired pebble diameter, cutting the rods into slugs of a length equal to their diameter and tumbling of the slugs in a rotary tumbling drum so as to compact the slugs into spheres. In most pebble forming processes the ingredients of the pebble are formed into a plastic extrudable mix with water and/or other suitable binder such as molasses, dextrin, and flour (corn, wheat, etc.); but, any organic combustible binder which burns off during the calcination process and leaves no deleterious residue may be used. It has been found that the alumina and other materials in the mix must be extremely finely comminuted in order to provide good crystal formation in the finished pebbles. The material should be ground or otherwise comminuted to a particle size (maximum dimension or diameter) such that at least 75 weight percent thereof is not over 6 microns in size and 20 weight percent is not over 2 microns in size. It is desirable to reduce particle size of the alumina and other constituents of the mix well below this maximum particle size in order to increase contacts among particles, improve the grain of the pebbles, and facilitate the growth of large lath-like crystallites in adequate concentration without firing the pebbles to a temperature which causes undue deterioration of the kiln.

In order to illustrate the improvement of the invention in alumina pebbles four batches of pebble material were weighed out, mixed, and wet ground in a rubber-lined ball mill for 24 hours using high alumina balls. The four batches, as charged to the ball mill had the composition shown in Table I.

TABLE I

| Raw material | Weight in grams | | | |
|---|---|---|---|---|
| | Body A | Body B | Body C | Body D |
| $Al_2O_3$ (high purity) | 1,100 | 1,094.5 | 1,029.6 | 1,024.1 |
| Georgia kaolin | | | 81.6 | 81.6 |
| Manganese carbonate, C.P. | | 5.5 | | 5.5 |
| Carbowax 4000 | 110 | 110 | 110 | 110 |
| Distilled water | 550 | 550 | 550 | 550 |

It was assumed that the fired bodies contained no residue from either Carbowax 4000 (an organic, polyethylene glycol, material) or distilled water. Hence, the essential ingredients of the mix were alumina, kaolin, and $MnCO_3$.

After ball-milling the slurry was dried at 230° F. and the dried material was broken up in a large porcelain mortar and the resulting material was passed thru a 65 mesh screen. The ball-milling reduced the particle size of the mix so that 95 percent thereof was less than 10 microns in size and 82 percent was below 6 microns in size, and about 20 percent was below 2 microns in size. Further reduction in particle size would have been desirable but was limited by the attrition equipment.

The screened material was pressed at a pressure of 16,200 p.s.i.g. into 1 inch diameter by ¾ inch high cylinders. One group of these cylinders was fired at 3100° F. for 5 hours (cone 33 down) and a second group was fired at 3180° F. for 3 hours (cone 34 at 4 o'clock) in a Remmey No. 2320 laboratory kiln. The higher temperature is about the maximum obtainable without excessive kiln deterioration.

Calculated fired compositions for the four bodies are set forth in Table II.

TABLE II

| Component | Body A | Body B | Body C | Body D |
|---|---|---|---|---|
| $Al_2O_3$ | 99.87 | 99.56 | 96.45 | 96.14 |
| $SiO_2$* | | | 3.13 | 3.14 |
| $MnO$* | | 0.31 | | 0.31 |

*Both silicon and manganese were probably present in a glassy matrix, at least in part. For simplification, they are shown as oxides. Very small amounts of other "oxides" were also present.

Thin sections of each body were prepared after firing. The thin sections were studied with the petrographic microscope and photomicrographs were made at a magnification of 250×. A study of these thin sections aided by the photomicrographs demonstrates that pebbles made in accordance with the invention contain a substantial proportion of lath-like crystals of a length over 200 microns, interspersed among smaller alumina crystals. The term "lath" as defined in Webster's Collegiate Dictionary, fifth edition, 1937, denotes "Any of a number of thin narrow strips of wood, nailed to rafters, ceiling joists, etc., . . . ." Hence, lath-like crystals are long, thin, and narrow in configuration.

It is to be understood that the procedure followed in making the cylindrical bodies for the above tests or study is not illustrative of the preferred method of making pebbles from the required raw materials. Pebbles are generally spherical and are made by a snowballing technique or by forming the plastic mix into cylinders by extrusion, cutting the cylinders into short slugs corresponding to their diameter, and tumbling the slugs to form compacted spheres. Any method of compacting the materials into spheres which will withstand handling during firing is within the scope of the invention. It is not necessary to apply high pressure in the forming step as was done in forming the small cylinders, but such technique may be used.

No attempts were made to measure the size of crystallites in bodies A and B. These bodies did not contain silicon other than 0.05 percent in the alumina raw material and developed a minimum of lath-like crystallites during firing. Bodies C and D with about 3.13 percent silica developed numerous lath-like crystallites but contained a fair percentage of irregular crystallites. The 10 largest lath-like crystallites in thin sections of bodies C and D were measured with the following results.

*Average length of 10 largest crystallites—microns*

| Body C-1 | Body D-1 | Body C-2 | Body D-2 |
|---|---|---|---|
| 82 | 101 | 156 | 248 |

Bodies C-1 and C-2 contained no manganese oxide but D-1 and D-2 contained 0.36 percent thereof. This tabulation shows the effect of manganese in promoting the development of lath-like crystallites in a high $Al_2O_3$ body containing 3.13 percent $SiO_2$. The effect of firing temperature is also shown.

The pebbles must be fired at the higher temperatures in the range for at least two hours and usually no longer than six hours is required in the firing in order to develop adequate crystal growth. However, longer firing periods are not detrimental but are generally uneconomical.

Certain modifications of the invention will become apparent to those skilled in the art and the illustrative details disclosed are not to be construed as imposing unnecessary limitations on the invention.

I claim:

1. A process for making heat exchange material capable of withstanding mechanical and thermal shock at elevated temperatures comprising preparing a homogeneous mixture of alumina, silica, and at least one member of a compound of a metal of the group consisting of manganese and iron which is in the oxide form after firing, the amounts of the constituents of said mixture being selected so that said material contains silica in the range of 1.0 to 7.0 weight percent, the oxide of said member in the range of 0.05 to 1.5 weight percent, and the balance of alumina; forming said mixture into desired shapes with the aid of an organic binder before firing; and thereafter firing said articles at a temperature in the range of 3050 to 3200° F. for a period of at least 2 hours so as to promote crystal growth of α-alumina and develop lath-like crystallites of α-alumina therein.

2. The process of claim 1 wherein the constituents of said mixture are reduced in particle size so that at least 75 weight percent thereof is not over 6 microns and 20 weight percent is not over 2 microns.

3. The process of claim 2 wherein said mixture is extruded into cylinders, said cylinders are cut into slugs of a length equal to the cylinder diameter, and said slugs are compacted by tumbling to form spheres.

4. The process of claim 2 wherein said mixture is formed into spheres by snowballing.

5. The process of claim 1 wherein the firing temperature is in the range of 3100 to 3180° F.

6. The process of claim 1 wherein said member is manganese carbonate.

7. The process of claim 1 wherein said member is iron oxide.

8. A heat exchange pebble consisting essentially of alumina, silica, and at least one member of the group consisting of manganese oxide and iron oxide, the silica being in the range of 1.0 to 7.0 weight percent, said member being in the range of 0.05 to 1.5 weight percent of the pebble, and the balance being alumina, said pebble containing a substantial proportion of lath-like crystals of α-alumina of a length over 200 microns.

9. The pebble of claim 8 wherein said member comprises manganese oxide.

10. The pebble of claim 8 wherein said member comprises iron oxide.

11. A heat exchange pebble consisting essentially of alumina, silica, and at least one member of the group consisting of manganese oxide and iron oxide, the silica being in the range of 2 to 4 weight percent, said member being in the range of 0.1 to 0.8 weight percent of the pebble, and the balance being alumina, said pebble containing a substantial proportion of lath-like crystals of $\alpha$-alumina of a length over 200 microns.

References Cited in the file of this patent

UNITED STATES PATENTS 2,685,528    Robinson -------------- Aug. 3, 1954